W. & T. SCHNEBLY.
Weighing and Registering Machine,
No. 8,748.
Patented Feb. 17, 1852.
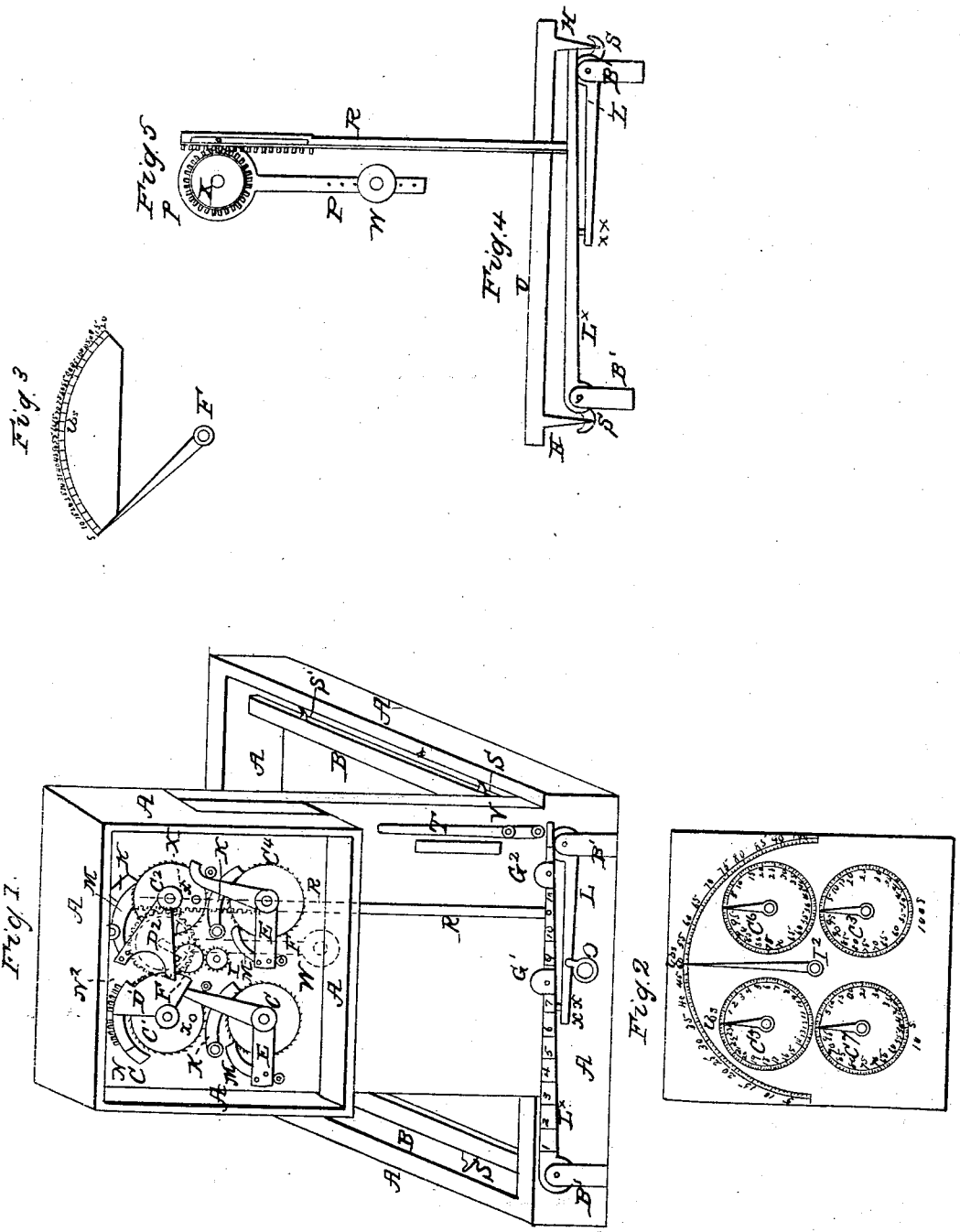

UNITED STATES PATENT OFFICE.

WILLIAM SCHNEBLY AND THOMAS SCHNEBLY, OF NEW YORK, N. Y.

IMPROVEMENT IN WEIGHING-MACHINES.

Specification forming part of Letters Patent No. 8,748, dated February 17, 1852.

*To all whom it may concern:*

Be it known that we, WILLIAM SCHNEBLY and THOMAS SCHNEBLY, of the city, county, and State of New York, have invented a new and useful Self Weighing and Registering Machine; and we do hereby declare that the following is a full, clear, and exact description thereof, reference being had to the accompanying drawings, making part of this specification, in which—

Figure 1 represents a perspective view; Fig. 2, a front elevation of the face-plate; Fig. 3, a back view of specific indicator; Fig. 4, front view of levers and floor; Fig. 5, view of pendulum and pinion-rod and rack.

The same letters indicate like parts in all the figures.

In our improved balance or weighing machine we employ a platform on which articles to be weighed are placed by throwing or rolling them on, and as our object is to indicate by a dial and pointer the weight of each article, and to register that amount, and also to register the number of times articles are weighed, we connect the platform by a series of levers with a pendulum-weight, which increases in weight as it is carried from the vertical line. In view of the kind of balance necessary to be used it becomes indispensable so to arrange the connections that the motion of the article to be weighed shall not be added to its weight and thus give a false indication and registration. The peculiar benefit of the said balance is that a register is thus kept of the entire weight of all that has been weighed, and also the number of times that articles have been weighed—as, for instance, if five hundred barrels have been weighed one index will indicate that number and the other will give the total weight of the five hundred barrels.

Our invention therefore consists in the employment of a method or methods of securing the lever or levers connected with the platform, so that the platform shall only yield to the weight of the article to be weighed, and not be affected by its motion when this is combined with a pendulous scale or balance which gives the weight by the extent of its vibration, and with the apparatus for marking or indicating the weight and for registering the same.

Our invention also consists in the employment of a pinion on the axis of the pendulous scale or balance to communicate motion to a lever that carries a ratchet to impart the required motion to a wheel that registers the extent of motion of the pendulous scale, and hence the amount of weight, when this is combined with a lever on the same axis of the pendulous scale or balance that acts on the lever of a pawl by a positive motion at each return motion of the pendulum to turn a ratchet that operates a register-wheel to register the number of times that articles are weighed. By means of this combination we are enabled to register the number of pounds of each weighing due to the extent of motion of the platform, and at the same time register the number of times that articles are weighed, which, to the best of our knowledge, has never been done before in any weighing-machine of which we have any knowledge.

Figure 1 represents a perspective view of the machine with the floor U (seen in Fig. 4) and the face-plate, Fig. 2, removed.

A A A A represent the outer frame.

B B are two horizontal parallel shafts having their bearings B' B' in the platform A A A A.

S S S S are supports attached to the parallel shafts B B, on which the points H H in Fig. 4 under the floor U rest to support the floor U, H H being attached to the floor U in the most mechanical manner suggested, S S S S being as near to the ends of the shafts B B as will be prudent to keep the floor U from tilting up when pressed on. There are various ways which may be employed to support the floor U, and we do not intend to confine ourselves to this particular mode, as represented in the drawings. Experience will more readily determine the best mode.

L$^\times$ L are two beams or levers placed one above the other or side by side and attached to the ends of the parallel shafts B B, so that when any commodity is placed upon the floor U, Fig. 4, the beams L$^\times$ L will rise upward, having the weight beyond the bearings or fulcrums B' B'. As a natural consequence, being levers of the first class, L$^\times$ may be divided into any number of divisions, as is usual in other scale-beams or otherwise, and might be used in a similar manner with a sliding P or weight G' to counterbalance wagons, carts, trucks, &c., or anything containing commodities to be weighed.

G² is another P or weight, which may be placed at any point in the scale-beam, and according to the distance and weight from the fulcrum will be equal to an equal weight on the floor U. G² may be multiplied in numbers and weight, so as to meet the greatest weight of the heaviest commodity to be weighed, leaving or throwing but little strain upon the pendulum P and washers above, which we deem a very important feature and improvement, as the platform can be made to resist all the stress and strain of the heaviest commodities, which will not injure the apparatus above. The lever L acts simultaneously with the lever $L^\times$ whenever any commodity is placed at any point on the floor U, the lever L being in contact with the lever $L^\times$ in the center of the distance at $xx$ between the bearings or fulcrums B' B', the contact being in the most mechanical manner to prevent friction, which must be observed throughout the construction of the machine. In the lever L at any suitable point a key $o$ may be introduced to bolt it to the frame A A A A and stop its motion altogether. When the bolt or key $o$ is withdrawn, both of the levers $L^\times$ and L are at liberty to act when commodities are placed on the floor U, and then it is that the machine is in the condition to receive commodities, which may rest upon it for the time being until the weight of the same is let down gradually to the equipoise by the commanding lever T, with its fulcrum at V and its lower end pressing on the extreme end of the lever $L^\times$. This will effectually prevent any undue impulse to the machinery, and consequently give a correct index of the weight of commodities. While the machine is in this condition extra bridges might be used to obviate the difficulty of any undue impulse from passing over the floor with trucks, carts, &c., provided the lever T was taken from its perpendicular position and giving liberty to the levers $L^\times$ and L. The extra bridges would have to touch the floor U on the one end and rest on the ground-floor of the other end, by which fixture, the commodity passing up the bridge, the weight of the same would be gradually transferred from the bridge to the floor U and from the floor U to the exit-bridge on the opposite side of the floor U, giving a correct index of the weight of the traveling or passing commodity, the extra bridges not being represented. But to change the condition of the machine the more effectually from the use of the two levers $L^\times$ and L and the laying or piling on commodities to be weighed to the condition and use of the machine for passing wagons, carts, trucks, &c., over it without stopping and without the use of the commanding lever T, we have only to introduce the key or bolt $o$ and check the motion of the lever L altogether, which will only permit the floor on the lever $L^\times$ side and the lever $L^\times$ to move. Consequently, by having an ascending bridge on the lever L side the commodity in passing over the floor U will gradually be felt as it approaches the point H on the lever $L^\times$ side from the L side, which will give a true index of the weight of the same without stopping and without any sudden impulse to the apparatus above or strain upon the same. In this case it would be proper and best to have a descending bridge when the platform is above the level of the ground-floor in either condition of the machine, whether the two levers $L^\times$ and L are employed or only the lever $L^\times$, the weight $G^2$ must be adjusted to suit, and also the weight W on the pendulum P in Fig. 5, which can be set higher or lower in the holes of the pendulum—as, for instance, if the weight $G^2$ is two pounds and the weight W on the pendulum one-quarter of a pound, when both levers $L^\times$ and L are in motion and the weight of the commodity is indicated to be one hundred pounds, the weights $G^2$ and W will not indicate the same weight as before if the key or bolt $o$ should check the motion of the lever L, so that it will be necessary to have proper and suitable P's or weights $G^2$ and W to be used when the machine is employed in its different conditions, or as a substitute they may be set farther from their fulcrums, which will be the same. This can be accomplished by weighing some commodity first—say one hundred pounds. Regulate your weights $G^2$ and W accordingly, either by increasing or diminishing them until the hands indicate the true amount on the specific indexes, and so when but one lever $L^\times$ is employed, regulated in the same way, by passing one hundred pounds over the floor U, taking care to counterbalance first the carriage or vehicle by the P G'. The variation occurs from the fact that the weight of the commodity in the case of the two levers $L^\times$ and L being employed is more immediately felt from the floor and machinery and with less friction perhaps, all points H H H H being at liberty to move. In the other condition, when only the lever $L^\times$ is employed, the weight of the commodity is not so sensibly felt, as two of the points H H on the L side are checked and inoperative partially, the latter being a gradual transfer of the weight, the former a more immediate application. T is the commanding lever with its fulcrum V in the upright portion of the frame, with the lower end suitably prepared to press upon the end of the lever $L^\times$, checking the motion of the machine or gradually permitting the weight of commodities to sink into equipoise by changing its position, suitable fixtures being used to confine it when in its perpendicular position.

R is the connecting-rod, having a rack on the upper end, as in Fig. 5, and kept in place by a pin and slot or otherwise gearing in a pinion X on the pendulum-shaft, the lower end being connected with the lever $L^x$, X being a pinion or portion of a wheel fastened on the shaft with the pendulum P. The pendulum P can be formed above suitably for the purpose of connecting with the other portion of the wheel-works by a mechanical coupling, which may be detached or attached at pleasure.

The duty of the pendulum and weight W is to play from the perpendicular, where it may rest against a pin to the horizontal line. Care should be taken to give sufficient distance always between the weight W and horizontal line by a proper regulation of the amount of the weight W and the weight $G^2$, so that in all cases more weight of commodity than that being weighed at the time would be necessary to carry the pendulum all the way up to the horizontal line. This precaution will allow the operator to absent himself and leave the machine in the hands of the attendants or laborers—as, for instance, a number of hogsheads or bales are to be weighed. The operator regulates the weights $G^2$ and W. The first hogshead carries the pendulum W two-thirds of the way, giving two thousand pounds on the index, which is capable of showing three thousand pounds by the full ascent of the pendulum and weight W, and as no other hogshead contains the additional weight of one thousand pounds there is no liability to overrun the machine and commit error in the absence of the operator, which happens to be the case in many instances from necessity and otherwise.

To be more explicit, the hand $I^x$ of the specific index, Fig. 2, can be made to rest at any of the divisions of the scale above. If the commodity weighs one hundred pounds, with $G^2$ weighing two pounds and W one-fourth of a pound, the same weight of commodity will only indicate fifty pounds by doubling the weight of $G^2$ and W or moving them farther from their centers, so that twice fifty equals one hundred pounds, and so on in proportion.

The pendulum-shaft may, if desired, be so arranged as to connect by a suitable coupling with the pinion-shaft the pinion of which is seen at F in Fig. 1, which pinion F gears into a smaller pinion I and a larger segmental piece D' with teeth on the same shaft of the ratchet-wheel.

$C'$ $C^2$ $C^3$ $C^4$ are four ratchet-wheels on shafts, which are long enough to protrude through the face-plate, Fig. 2, to receive their respective hands or pointers. So likewise the shaft of the pinion I extends through to receive its hand or pointer $I^x$.

$N^x$ is a series of independent propelling clicks or pawls which play in a box on the segment D'.

N is a series of clicks or pawls which play in a stationary box to confine the ratchet-wheel C' (all of which fall into the teeth of the wheel by their gravity and nearly perpendicular position) on the return or backward motion of the segment D'.

$D^2$ is another segmental piece with its propelling click, &c., on the shaft of the ratchet-wheel $C^2$.

E E are levers on the shafts of ratchet-wheels $C^3$ and $C^4$.

D' $D^2$ and E E are segments and levers, being loose on their respective shafts.

M M M are propelling clicks or pawls of the wheels $C^2$ $C^3$ $C^4$.

K K K are clicks or pawls so placed to drop by their gravity, and to confine the wheels on which they fall, when $D^2$ and E E move back to take another tooth, which is only to be accomplished by one motion of the machine.

⊚ ⊚ ⊚ ⊚ are pins to keep the levers E E in proper position. The centers of the clicks or pawls K K K are stationary. The centers of the pawls M M M are in their levers. o o o are pins to keep them in their places.

The object of making the pinion I smaller than the pinion F is to get a greater sweep or space for the pointer $I^x$, which may be made to sweep half-way or the whole way, if desired, which indicates the specific weight as it passes from left to right.

$o^x$ and $o^x$ are pins in C' and $C^2$ to act upon the levers E E of $C^3$ and $C^4$.

o' is a pin in the pinion F to act upon the segment $D^2$, which propels the wheel $C^2$.

It is desirable to make the pinion F as small as possible, so as to give as little motion to the ratchet-wheel C' as will enable the machine to work progressively so much the longer.

On the shaft of the pinion F, next to the floor side of the machine, another hand or pointer $F^x$ may be placed, with its scale to indicate the specific weight of commodities, as in Fig. 3. This hand cannot move through the same space as the hand $I^x$ on the shaft of the pinion I, but could be made to do so, if required, by introducing another pinion or fixing it on the opposite end of the pinion I, when it would have an opposite motion from right to left.

The face-plate, Fig. 2, is to be laid off in five disks or indices, one marked specific indicator in equal spaces for pounds to one hundred, which will be sufficient for all purposes. The disk $C^5$ should be divided into any number of equal spaces, and, if desired, may be subdivided again into equal parts—say, first, twenty-four spaces, which will indicate twenty-four hundred pounds, and subdivided each into four spaces, each equal to twenty-five pounds. This disk is the register of the specific weights. The number of pounds indicated by the hand $I^x$ must agree with the number of pounds indicated by the hand of the disk $C^5$. To accomplish this, make one careful movement of the pendulum from the perpendicular to the horizontal line with the hands on their shafts at the points of starting, and it is done. That space, of course, must be equal to one of the divisions of the whole number into which the disk is divided. Consequently the pointer in $C^5$ would stand at figure "1" and I$^\times$ at figure "100." The disk C$^7$ should be divided into a corresponding number of spaces with the teeth of the wheel C$^3$, Fig. 1. This disk is the register of the aggregate amount of weight. So, also, should the disk C$^6$ be divided with the same number, this being the numerating-register. So, also, should the disk C$^8$ be divided alike, this being the aggregate-numerating register. All the wheels C' C$^2$ C$^3$ C$^4$ should be cut very fine, which will cause it to work so much the longer before the hands of C$^7$ and C$^8$ make one revolution. It will be readily understood that by a multiplication of similar wheels and disks the registering and numerating might be carried to an indefinite period.

Many mechanical changes may be suggested by experience; but we do not contemplate any change in the arrangement of the principle of propulsion and check of the ratchet-wheel C' by the employment of a series of nearly-vertical independent clicks or pawls N and N$^\times$ in their respective boxes on the segment D' and back plate of the wheel-works. This simple arrangement accomplishes the duty without the possibility of an error. These clicks or pawls should be multiplied sufficiently to take up all the loss of motion in the revolution of the wheel C'—as, for instance, in very fine teeth five or six pawls should be made to drop one after the other from the points of as many teeth in the time the wheel C' is passing through the space of one tooth only. So, likewise, this should be in either community or box.

Having now described the manner of constructing the machine, we proceed to show how the operation is carried on. By laying any commodity on the floor U, Fig. 4, the weight is felt at H S and W S, which raises up the levers L$^\times$ and L, pressing against the connecting-rod R, and by raising it the segment or pinion X and the pendulum P are made to move, which raises the weight P W and indicates the weight of the commodity in the index of the specific indicator of Fig. 3. Many machines may be used in this condition for economy's sake which will be beautifully simple and convenient; and then the pendulum-shaft being one and the same with the shaft of the pinion F, or coupled thereto, (we would here remark that experience may show the propriety of having the shafts of the pendulum P located lower down and at some distance from the shaft of the pinion F, with a suitable connection,) which moves the pinion I and the segment D' with the clicks N$^\times$ and the wheel C' by the pawls or clicks N$^\times$. When the pinion F first begins to move, the pin o' leaves the segment D$^2$, drops down by its gravity to the shaft, and there rests, causing the pawl M of said piece D$^2$ to take a fresh tooth, and so on at even motion. When the equipoise has been attained, the pointer I$^\times$ will tell the same as the pointer on C$^5$, whatever it may be, and when the commodity is removed from the floor U the pendulum and weight W assume its perpendicular position, move the pinion F back again, causing the segment D', with their pawls or clicks N$^\times$, to play over the teeth, while the pawl N holds the ratchet-wheel C' immovable at the same time the segment D$^2$ is moved by the pin o' in F and propels the ratchet-wheel C$^2$ one tooth by the click M, which is fixed to it. As this duty is repeated the pointer in C$^5$ is progressing. So, also, are the rest of the pointers, though not so rapidly. As the wheels C' and C$^2$ revolve they press the pins o$^\times$ o$^\times$ against the upright curved part of the levers E E, which moves the wheels C$^3$ and C$^4$ one tooth each. Consequently the wheels C' and C$^2$ make one revolution each to one tooth of the other two wheels C$^3$ and C$^4$. Therefore, if C' be divided into twenty-four hundred and C$^3$ makes one revolution, and it being divided into ninety-six teeth, the result will be two hundred and thirty thousand and four hundred pounds weighed and indicated on C$^7$, and if the wheels C$^2$ and C$^4$ be divided into ninety-six teeth one revolution of C$^4$ will numerate nine thousand two hundred and sixteen, indicated on C$^8$. Thus you will readily perceive that by increasing the diameter of the wheels and the number of spaces and teeth, or by adding more wheels to the four now employed, the machine could be worked without stopping until the amount of weight would be beyond the power of enumeration; and so, also, the aggregate of numbers, as the principle has no limit. The beginning-point in C$^5$ C$^6$ C$^7$ C$^8$ should be at the top of the circle, as in Fig. 2; that of I$^\times$ at the horizontal line, or as the taste of persons may dictate. When the machine is in connection with the registering and numerating apparatus, the pointer or hand I$^\times$ will always retire to its starting-point, when the commodity is removed, while the others pass onward from left to right, as the hands of a clock.

From this description it will be seen that our improvements are different from those of weighing-machines now in use, being a mechanical result.

What we claim as our invention, and desire to secure by Letters Patent, is—

1. The employment of the method or methods of securing the lever or levers connected with the platform by means of a stop or brake to hold the platform, substantially as described, when this is combined with the pendulous scale or balance and the apparatus for registering the extent of motion of the said pendulous scale or balance, substantially as specified, by means of which combination we are enabled to register accurately the weight of bodies that roll or slide or are thrown onto the platform and prevent the apparatus from registering in addition to the actual weight the momentum of the descending weight of the body to be weighed.

2. The employment of the mechanism which registers the number of weighings, substantially as specified, when this is combined with the pendulous balance or its equivalent and its register for registering the sum of the weights weighed by the pendulous balance, substantially as described, whereby an accurate register is kept not only of the number of articles which have been weighed, but also of the whole weight of what has been weighed, as it is often important to ascertain not only the sum of the things weighed, but also the number of articles which make up that sum.

WM. SCHNEBLY.
THOS. SCHNEBLY.

Witnesses:
GEO. E. KIRBY,
HORATIO BOGERT.